United States Patent [19]

Srackangast

[11] Patent Number: 4,484,724
[45] Date of Patent: Nov. 27, 1984

[54] FORMING ELEMENT AND FORMING APPARATUS FOR CASTING MANHOLE INVERTS

[76] Inventor: James Srackangast, Rt. 2, Box 888-3, Harrisburg, N.C. 28075

[21] Appl. No.: 452,199

[22] Filed: Dec. 22, 1982

[51] Int. Cl.³ .............................................. E21D 10/00
[52] U.S. Cl. ...................................... 249/11; 249/145; 249/151; 249/184
[58] Field of Search ............... 249/11, 53 R, 144, 145, 249/175, 176, 151, 177, 184

[56] References Cited

U.S. PATENT DOCUMENTS

| | | |
|---|---|---|
| 725,098 | 4/1903 | Learned . |
| 1,145,228 | 7/1915 | Blayney . |
| 1,560,811 | 11/1925 | DeLa Mare . |
| 4,085,918 | 5/1978 | Wilkerson . |
| 4,278,229 | 7/1981 | Burlett ................................. 249/11 |
| 4,314,775 | 2/1982 | Johnson ................................ 249/11 |
| 4,318,880 | 3/1982 | McIntosh et al. ..................... 249/11 |

OTHER PUBLICATIONS

Mecklenburg Co., North Carolina, Engineering Dpt., "Standard Detail–Storm or Sanitary Sewer Manhole", May 16, 1974.

Charlotte-Mecklenburg Utility Dpt., Charlotte, N.C., Engineering Div., "Standard Detail–Outside Drop Manhole, Pipes 12 Inches and Larger", Aug., 1972.

Primary Examiner—Donald Czaja
Assistant Examiner—Mary A. Becker
Attorney, Agent, or Firm—Richards, Shefte & Pinckney

[57] ABSTRACT

Apparatus for forming inverts in manhole floors between angularly-related pipeline sections includes a set of a plurality of wedge-shaped forming elements each having a molding surface of corresponding compound longitudinal and transverse arcuate curvature, the forming elements being of respectively varying longitudinally arcuate extents and being adapted for longitudinal end-to-end joinder for producing a variety of angular curvatures. The forming apparatus is set-up in the manhole between the pipeline sections with the molding surface downwardly facing and concrete is poured about the apparatus, the concrete thereby setting in conformity with the apparatus' molding surface to create a curvilinear invert between the pipeline sections.

25 Claims, 5 Drawing Figures

FORMING ELEMENT AND FORMING APPARATUS FOR CASTING MANHOLE INVERTS

BACKGROUND OF THE INVENTION

The present invention relates to forming elements and apparatus and particularly to such elements and apparatus employed in casting cementitious material as an invert or trough in a manhole or the like.

In the conventional construction of pipeline systems for sewage and storm drainage and the like, manholes of the form of an upright tubular housing are located at strategic points in the pipeline network to provide access thereto for maintenance, repair and similar activities, manholes being typically located at periodic spacings along linear sections of pipeline and at the junction of two or more pipeline sections. In the normal manhole construction, the manhole housing is formed with openings at its lower end into which partially extend and open the respective ends of the various pipeline sections and, to provide desired flow between the pipeline sections, a floor is formed in the bottom of the manhole housing cast of cementitious material such as concrete extending to at least approximately half the height of the pipes with a U-shaped trough or troughs, commonly referred to as an invert or inverts, formed in the cementitious material extending as desired between the ends of the pipeline sections. Traditionally, such manhole floors have been formed by pouring a sufficient quantity of the cementitious material into the bottom of the manhole housing and manually working the material by hand troweling throughout substantially the entire time period required for casting of the material, a practice which will readily be recognized to be extremely laborious and time consuming and further at best provides imprecise, albeit functional inverts but in certain cases can produce an invert which is so unacceptably roughly finished that the entire removal and reformation of the manhole floor is required.

As an alternative, various types of molds, forms and forming apparatus have been proposed for disposition in the bottom of a manhole housing extending between the pipeline ends opening therein during the pouring of the cementitious material to mold the material as it sets to form therein the desired invert or trough. Examples of such devices and apparatus are disclosed in U.S. Pat. Nos. 725,098; 4,085,918; and 4,278,229. However, such forms substantially only contemplate and provide for the formation of linear inverts between aligned pipeline sections and angularly-intersecting linear invert sections between angularly-oriented pipeline sections and, in practice, such forms have met with minimal industry acceptance limited primarily to usage in forming "straight through" linear inverts between aligned pipes, it still being widely preferred to hand trowel inverts between angularly oriented pipes to provide an at least roughly curved invert therebetween which is greatly preferred over angularly-intersecting linear invert sections. One type of forming apparatus which has been used successfully to form a generally simulatively curved invert between angularly-oriented pipelines employs one or more forming elements formed as wedge-like angular sections of linear forms which wedge-like sections may be arranged individually, in combination and between straight forms as desired to provide an invert having several linear sections which longitudinally extend progressively angularly to one another in a step-like fashion to generally simulate a longitudinally curved invert. However, to date, no satisfactory form or forming apparatus is known to have been developed to provide for the formation of longitudinally curved inverts.

The present invention affords a much needed improvement in the forming element and forming apparatus of the latter above-described type in providing a workable, easily-usable forming element and forming apparatus which is adapted to selectively form curvilinear inverts of precise transverse and longitudinal compound curvature between angularly-oriented pipeline sections.

SUMMARY OF THE INVENTION

In one aspect of the present invention, a forming element is provided for use in casting cementitious material to form a curvilinear invert section in a manhole or the like. The forming element includes a molding surface having a transverse extent and a longitudinal extent and the molding surface is substantially semicircularly curved in its transverse extent for the entirety of its longitudinal extent and is substantially arcuately curved in its longitudinal extent concentrically at each transverse side thereof for the entirety of its transverse extent. In this manner, the forming element is adapted to be disposed in the manhole with the molding surface in a downwardly facing disposition for pouring and casting of the cementitious material thereabout to cause a depression to be cast in the cementitious material in conformity with the longitudinal and transverse curvatures of the molding surface thereby to form the invert section with a precise longitudinally and transversely arcuate compound curvature. In the preferred embodiment, the forming element is wedge-shaped, the longitudinal ends of its molding surface extending radially relative to the longitudinal curvature thereof defining a predetermined angular degree of longitudinal curvature between such longitudinal ends and end walls respectively extending transversely of the molding surface at its longitudinal ends radially therewith. Reinforcing members are preferably provided extending longitudinally between the end walls at the inward side of the molding surface.

According to another aspect of the present invention, an invert forming apparatus includes a plurality of the above-described forming elements, the molding surfaces thereof respectively having corresponding transverse and longitudinal curvatures and the forming elements being adapted for selective assembly in longitudinal end-to-end relation with their transverse and longitudinal extents in respective alignment. In this manner, the forming elements may be disposed individually and in selective assembled combinations in the manhole in the above-described manner, thereby for forming invert sections with selectively variable longitudinal and arcuate extents. In the preferred embodiment, an assembly arrangement is provided for joining the end walls of the forming elements in abutment to permit the aforesaid selective assembly thereof. The molding surfaces of the forming elements are respectively of varying longitudinal and arcuate extents between their respective longitudinal ends, each molding surface being of a respective angular degree of longitudinal curvature which is a factor of 90° and the total angular degree of longitudinal curvature of the molding surfaces being at least substantially 90°. Preferably, the various molding surfaces are of respective longitudinal curvatures of approximately 22.5°, 11.25° and 5.625°. It is additionally preferred that the radii of longitudinal curvature of the molding surfaces are of a predetermined relation to the dimensions of the manhole such that the total longitudinal extent of all the molding surfaces is smaller than the dimension of the manhole at which the invert is desired, the radius to the longitudinal centers of the molding surfaces preferably being smaller than the radius of curvature of the manhole.

In another aspect of the present invention, an invert forming apparatus particularly adapted for casting manhole inverts between an inlet and an outlet pipe angularly-oriented in the manhole includes at least one longitudinally-curved forming element of the above-described type, preferably the above-described plurality of forming elements, and two longitudinally-straight forming elements. Each of the straight forming elements respectively has a hemi-cylindrically shaped molding surface of a radius substantially the same as the internal radius of the inlet and outlet pipes and the transverse curvature of each curved forming element is of the same radius. The straight forming elements are accordingly adapted for slidable disposition respectively in the inlet and outlet pipes and the straight and curved forming elements are adapted for end-to-end assembly whereby the forming elements may be disposed and assembled in the manhole in the above-described manner to extend between the pipes for forming a longitudinally arcuate invert therebetween. In the preferred embodiment, a bracing arrangement is provided which is adapted for extending between the inlet and outlet pipes and the forming elements when assembled in the manhole to maintain the forming elements in desired disposition during the pouring and casting of the cementitious material.

DESCRIPTION OF THE PREFERRED EMBODIMENT

Figure 1:
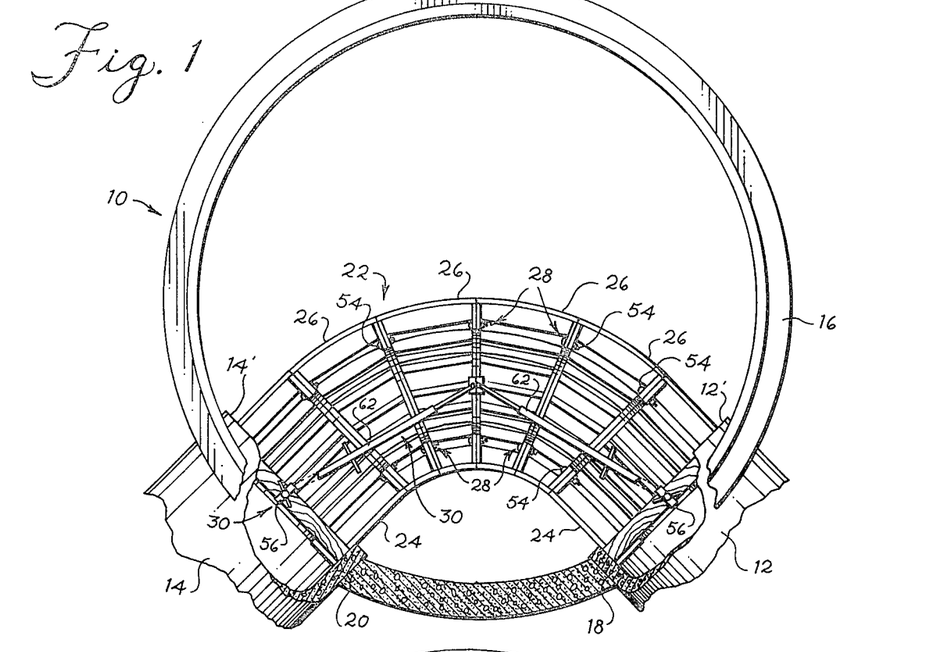
FIG. 1 is a top plan view of a manhole invert forming apparatus according to the preferred embodiment of the present invention assembled between an inlet and an outlet pipe in a conventional manhole housing.
Figure 2:
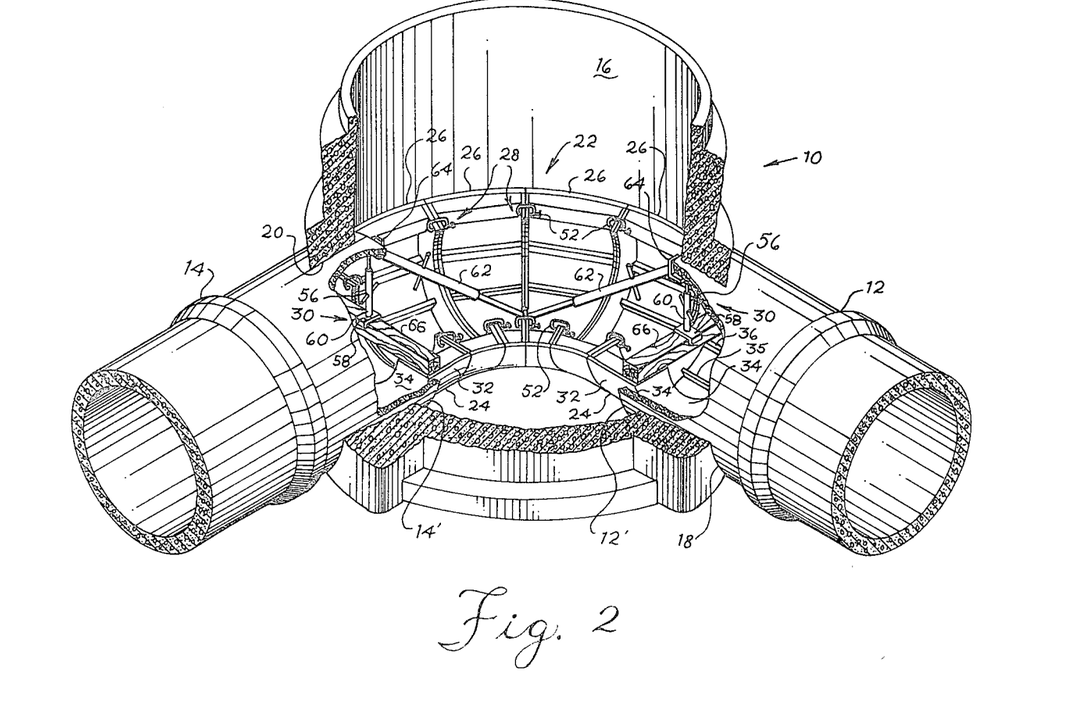
FIG. 2 is a perspective view of the manhole invert forming apparatus of FIG. 1.

Referring now to the accompanying drawings and initially to FIGS. 1 and 2, a manhole is indicated generally at 10 at the junction between two perpendicularly oriented pipeline sections 12,14. The manhole 10 is of the conventional type constructed vertically upright from the ground at the desired location, typically within an excavated area, as a circularly tubular manhole housing 16 which may be a unitarily precast concrete member or may be of masonry construction formed of stacked courses of preformed concrete or similar building blocks. The pipeline sections 12,14 are formed of circular pipe of the conventional precast concrete type and the manhole housing 16 has formed therein at is lower end respective circular openings 18,20 of a slightly larger diameter than the pipe though which openings 18,20 the respective ends 12',14' of the pipeline sections 12,14 slightly extend horizontally and open into the interior of the manhole housing 16. As will be understood, the manhole 10 performs the dual function of connecting the flow paths of the pipeline sections 12,14 and of providing access into each pipeline section 12,14 for maintenance, repair or any other similar reason. To provide the desired connection of the flow paths of the pipeline sections 12,14, a floor is constructed of concrete or a similar hard-setting cementitious material at the bottom of the manhole housing 16 to approximately one-half the height of the pipeline ends 12',14' and a trough, normally referred to as an invert, is formed in the floor to extend between the two pipeline ends 12',14', all as is conventional.

The present invention provides a novel forming apparatus employing a novel forming element particularly adapted for use in molding and casting the concrete floor in manholes such as that of FIGS. 1 and 2 in which the pipeline sections to be connected are angularly oriented to facilitate the precise molded formation of curvilinear inverts between the pipeline sections with a transverse arcuate curvature corresponding to the pipelines and a longitudinal arcuate curvature corresponding to the angular relation of the pipeline ends. The preferred embodiment of the forming apparatus is illustrated in FIGS. 1 and 2, being indicated therein generally at 22, as preferably installed in the bottom of the manhole 10 to extend between the ends 12',14' of the pipeline sections 12,14 such that concrete may be poured into the bottom of the manhole 10 to the desired height and will be caused to cast in conformity with the forming apparatus 22 to produce a floor having the aforementioned curvilinear invert between the pipeline section 12,14. Basically, the forming apparatus includes two longitudinally-straight forming elements 24, one or more longitudinally-curved forming elements 26 according to the present invention, an assembly arrangement, generally indicated at 28, joining the forming elements 24,26 in desired modling disposition, and a bracing arrangement, generally indicated at 30, for rigidly maintaining the forming elements 24,26 in desired molding disposition during the concrete pouring and casting process.

The straight forming elements 24 are generally of the conventional type constructed of a hemi-cylindrical shape, each straight forming element 24 basically including a supporting framework 35 about which is affixed a substantially smooth hemi-cylindrically shaped molding surface 32 defined by a radius substantially the same as or only slightly smaller than the internal radius of the pipeline sections 12,14 at their ends 12',14'. The supporting framework 35 includes two semi-circularly shaped planar end walls 34 fixed in parallel opposed spaced relation by a plurality of longitudinal reinforcing struts 36 extending axially between and affixed respectively to the end walls 34 at their circumferential edges 34'. The molding surface 32 is of a longitudinal, i.e., axial, extent corresponding to the spacing of the end walls 34 and is of a transverse, i.e., circumferential, extent corresponding to the semi-circular circumferential extent of the end walls 34 and the radial dimension of the end walls 34 is smaller than the desired radial outer dimension of the molding surface 32 by approximately the dimensional thickness thereof, the molding surface 32 being affixed outwardly to the end walls 34 and the longitudinal struts 36 coextensively therewith by set screws (not shown) or other conventional affixations means, thereby producing the desired hemi-cylindrical forming element 24.

As part of the assembly arrangement 28 of the present invention, the end walls 34 of the straight forming elements 24 having openings 38 forming axially therewith at selected locations thereabout, the assembly arrangement 28 being described more fully hereinafter. The respective components of the straight forming element 24 may be constructed of any suitable material having sufficiently high impact and bending strength to withstand the ordinary forces presented by the pouring and working of concrete, e.g., wood, high impact plastic, or the like. Preferably, the straight forming elements 24 are molded entirely of plastic, the end walls 34 and the struts 36 being unitarily molded as a single element and the molding surface 32 being unitarily molded in the desired curvature as a single element for fitted affixation as described to the end walls 34 and struts 36. Alternatively, the end walls 34 may be fabricated of plywood and the longitudinal struts may be fabricated of conventional lumber, e.g., conventional two inch by four inch framing lumber, with the end walls 34 and struts 36 affixed to one another as described, and a planar sheet of suitable plastic or plywood material may be affixed thereabout to form the material to the desired curvature to provide the molding surface 32.

Figure 3:
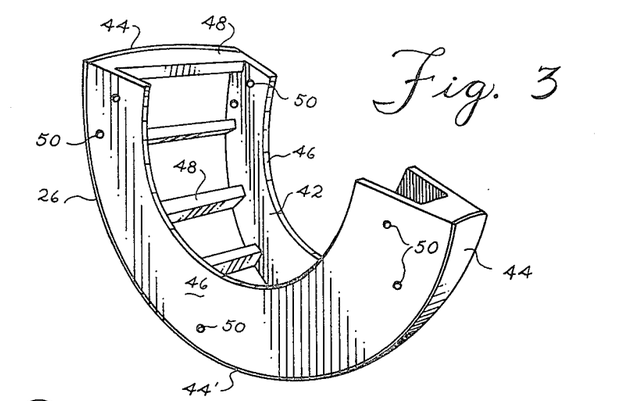
FIG. 3 is a perspective view of a manhole invert forming element according to the preferred embodiment of the present invention.
Figure 4:
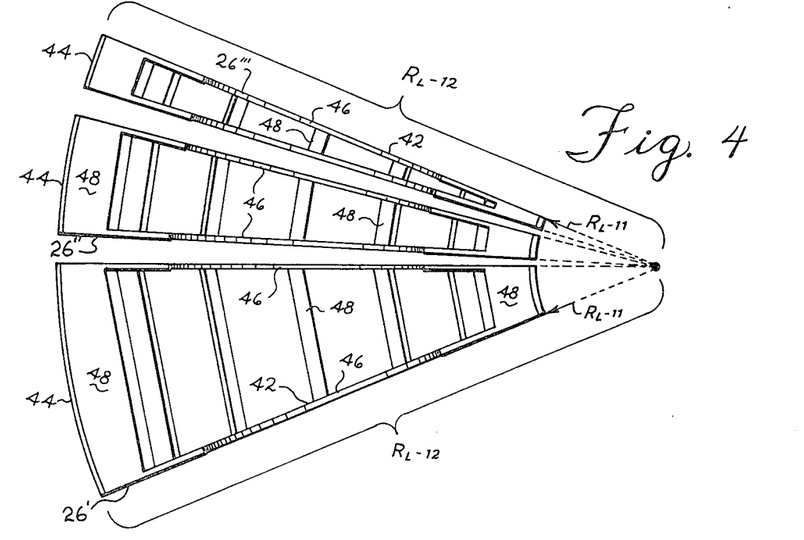
FIG. 4 is a top plan view of several manhole invert forming elements of the type of FIG. 3.
Figure 5:
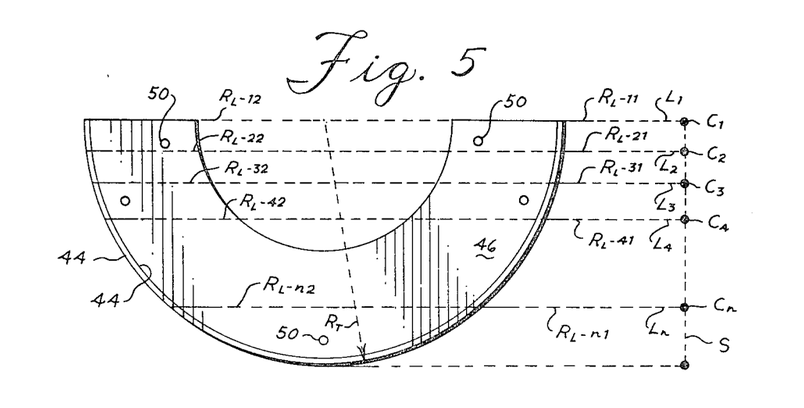
FIG. 5 is an end view of one of the manhole invert forming elements of FIG. 4.

Referring now to FIGS. 3–5, the forming apparatus 22 preferably includes a set of a plurality of the longitudinally-curved forming elements 26, each curved forming element 26 being substantially wedge-shaped of a comparable basic construction as the straight forming elements 24 including a wedge-shaped supporting framework 42 about which is affixed a substantially smooth compoundly curved molding surface 44. The supporting framework 42 includes two semi-circularly shaped planar end walls 46 substantially identical to the end walls 34 of the straight forming elements 24, the end walls 46 being fixed in angular opposed spaced relation by a plurality of arcuate reinforcing struts 48 extending arcuately between and affixed respectively to the end walls 46 at their circumferential edges 34'. The compound curvature of the molding surface 44 resides in a substantially semi-circular curvature in its transverse extent for the entirety of its longitudinal extent and a substantially arcuate curvature in its longitudinal extent concentrically at each transverse side thereof for the entirety of its transverse extent. More specifically and with reference to FIGS. 4 and 5, the molding surface 44 is substantially semi-circularly curved in each transverse cross-section thereof taken radially to the longitudinal curvature thereof (as indicated by lines T in FIG. 4). The radius of such transverse curvature is indicated in FIG. 5 by line $R_T$ and is substantially the same as the radius of curvature of the straight forming elements 24 and of the pipes 14,16 hereinabove discussed. Further, the molding surface 44 is curved in each longitudinal cross-section thereof taken parallel to the diametric extent thereof (as indicated by lines $L_1, L_2 \ldots L_n$ in FIG. 5) at each transverse side of the longitudinal extent substantially arcuately about a respective common center point $C_1, C_2 \ldots C_n$ for the entirety of its transverse extent. The radii of such longitudinal curvature to the respective transverse sides of the molding surface 44 are indicated in FIGS. 4 and 5 by lines $R_{L-11}, R_{L-12}; R_{L-21}, R_{L-22}; \ldots R_{L-n1}, R_{L-n2}$. As will be understood, all of such center points $C_1$ to $C_n$ lie in a linear segment S which constitutes the axis of longitudinal curvature of the forming element 26. In this manner, each molding surface 44 defines a precise longitudinally and transversely arcuate compound curvature.

The supporting framework 42 of each curved forming element 26 is constructed with its end walls 46 oriented radially relative to the longitudinal curvature of the molding surface 44 and with the struts 48 formed with respective outwardly-facing arcuate surfaces 48' of curvatures corresponding to the longitudinal curvature of the molding surface 44. The longitudinal extent of the molding surface 44 is defined by longitudinal ends 44' which extend radially relative to the longitudinal curvature of the molding surface 44 such that the longitudinal extent corresponds to the arcuate spacing of the end walls 46. The transverse extent of the molding surface 44 is substantially the same as the transverse extent of the molding surface 32. As best seen in FIG. 4, the respective molding surfaces 44 of the curved forming elements 26 in the set are correspondingly curved about identical radii of transverse and longitudinal curvature and it will therefore be understood that the respective curved forming elements 26 may be arranged longitudinally end-to-end to define collectively a continuous precise longitudinally and transversely arcuate curvature. As with the straight forming elements 24, each curved forming element 26 is provided with several openings 50 formed axially through its end walls 46 at selected locations thereabout as part of the assembly arrangement 28. The respective framework 42 and molding surfaces 44 of the curved forming elements 26 are preferably constructed of the same materials as the straight forming elements 24, it being preferred that each supporting framework 42 be unitarily molded of a suitable plastic and that each molding surface 44 be similarly molded to its desired compound curvature. Alternatively, the end walls 46 and struts 48 of each supporting framework 42 may be formed of wood to the desired above-described shapes, the struts 48 particularly being contoured to provide the described arcuate outer surfaces, and then assembled by appropriate conventional means. The molding surface 44 may alternatively be formed from a planar sheet of suitable plastic or other materials and of an appropriate equilateral trapezoidal shape and affixed to the end walls 46 and struts 48 of its associated framework 42 to form the planar sheet material to the desired compound curvature.

In ordinary practice in the conventional design and construction of sewage and storm drainage systems, it is highly desirable that the degree of angular relation between pipeline sections converging at a manhole location be as small as possible and preferably no greater than ninety degrees so that the curvature of flow through the manhole between the pipeline sections is minimized as best as is possible to reduce chances of problems of flow control and flow disruption. As will be understood, the respective radii of longitudinal curvature of the curved forming elements 26 as above-described must be selectively predetermined in the construction of the curved forming elements 26 in relation to the diametric size of the manhole in which the curved forming elements 26 are to be used, in relation to the diametric size of the pipes of the pipeline sections being joined, and in relation to the angular degree of curvature between the pipeline sections, such that the dimensions of the longitudinal and transverse extents of the curved forming element or elements 26 necessary to provide the desired degree of arcuate curvature thereof will be suitably smaller than the corresponding dimensions of the manhole arcuately between the pipe ends to be joined. In the preferred embodiment of the present invention, the forming elements 26 have been dimensionally designed with a view to facilitating the accommodation in conventional sized manholes of a curved forming element or elements 26 having an angular degree of longitudinal curvature of substantially ninety degrees (90°). For this purpose, the radius of longitudinal curvature to the longitudinal centerline of the molding surfaces 44 of the curved forming elements 26 must be no greater than approximately the same as, and preferably should be smaller than, the radius of curvature of the manhole. As will be understood, the diameter of the pipes to be joined will determine the other hereinabove described radii of longitudinal curvature of the forming elements 26. In this manner, the longitudinal extent of one or more curved forming elements 26 having a total angular degree of longitudinal curvature of 90° will be approximately the same as or smaller than the corresponding arcuate dimension of the manhole between pipe ends oriented therein at 90° relative to one another and, of course, the longitudinal extent of one or more correspondingly curved forming elements 26 having a smaller than 90° total angular degree of longitudinal curvature will be even smaller than the corresponding arcuate dimension of the manhole between pipe ends relatively oriented therein at less than 90°.

The several curved forming elements 26 of the set thereof are preferably constructed respectively of varying longitudinally arcuate extents of their molding surfaces 44 to facilitate the selective use of the forming elements 26 variously individually and in selective assembled combinations thereof to facilitate the provision of one or more of the curved forming elements 26 of substantially any total angular degree of curvature of up to and including 90°. Each curved forming element 26 is constructed of a respective angular degree of longitudinal curvature which is a mathematical factor of 90°, and preferably the several forming elements 26 respectively have longitudinal curvatures of twenty-two and one-half degrees (22.5°), eleven and one-fourth degrees (11.25°), and five and five-eighths degrees (5.625°) as indicated by curved forming elements 26′, 26″, 26‴, respectively, in FIG. 4. A sufficient number and variety of such forming elements 26′, 26″, 26‴ is provided in each set to at least provide a total angular degree of longitudinal curvature of substantially 90°.

The assembly arrangement 28 hereinbefore mentioned includes a set of conventional C-clamps 52 and a set of mating nut and bolt assemblies 54 adapted to be received through the openings 38,50 in the end walls 34,46 of the straight and curved forming elements 24,26. As will be understood, the openings 38,50 of the straight and curved forming elements 24,26 are formed in the end walls 34,46 of each thereof at corresponding locations so as to be aligned respectively with one another when respective end walls 34,46 of the forming elements 24,26 are abutted end-to-end. The C-clamps 52 are employed at each abutting pair of end walls 34,46 in the initial assembly of the forming elements 24,26 to hold the forming elements 24,26 in the desired end-to-end abutment so that the bolts of the nut and bolt arrangements 54 may be inserted through the aligned openings 38,50 and the nuts may be tightened thereon.

The operation and use of the forming apparatus 22 of the present invention may accordingly be understood with reference again to FIGS. 1 and 2. Initially, a straight forming element 24 is slidably positioned in each respective pipe end 12′,14′ with the molding surface 32 facing downwardly and in surface contact against the lower half of the interior surface of the respective pipeline section 12,14 at its end 12′,14′. One or more of the curved forming elements 26 are selected totaling in their longitudinal arcuate degrees of curvature substantially the angular relation of the pipeline sections 12′,14′ and such selected curved forming elements 26 are oriented with their molding surfaces 44 downwardly facing and affixed successively in end-to-end abutment between the straight forming elements 24 by employing the C-clamps 52 and the nut and bolt assemblies 54 of the assembly arrangement 28 in the above-described manner, the straight forming elements 24 being adjustably moved slidably outwardly or inwardly of the pipe ends 12′,14′ as necessary during this assembly process to accommodate the abutting disposition of the curved forming elements 26 therebetween. Once the straight and curved forming elements 24,26 have been thusly positioned and assembled, the C-clamps 52 and the various nut and bolt assemblies 54 are adjusted if necessary and tightened securely to complete the assembly of the forming elements 24,26. In the particular embodiment illustrated in FIGS. 1 and 2, the pipeline sections 12,14 are oriented at 90° to one another, and accordingly four curved forming elements 26′ of the 22.5° type are employed to provide the needed 90° arcuate curvature of the curved forming elements 26. However, as will be understood from the above discussion, other assemblies of various other combinations of forming elements 24,26 may be employed to achieve an assembled forming apparatus of substantially any curvature ordinarily encountered in the conventional construction of manholes.

As will be understood by those skilled in the art, the assembled forming elements 24,26 in themselves are not of sufficient mass and rigidity to retain their desired molding disposition as installed in the manner thus far described against the forces generated by the pouring of concrete into the manhole housing 16 and accordingly, following the completion of the assembly of the forming elements 24,26, the aforementioned bracing arrangement 30 is installed to rigidify the forming elements 24,26 in their assembled disposition. Basically, the bracing arrangement 30 includes two relatively short conventional jackscrews 56 of the type having an inverted U-shaped support member 58, an extension shaft 60 threadedly mounted thereon to be rotatably extensible therefrom and a flat bearing member (not shown) mounted at the extending end of the shaft 60, and further includes two substantially similar but considerably longer jackscrews 62 having V-shaped support and bearing members 64. Before installing the jackscrews 56,62, the transverse sides of the assembled unit of forming elements 24,26 are initially substantially leveled relative to one another. Each jackscrew 56 is respectively installed vertically between one of the straight forming elements 24 and the upper interior surface of the respective pipe end 12′,14′ by positioning a cross member 66 such as a suitable length of lumber or the like transversely across and between the upper transverse sides of the straight forming element 24, positioning the support member 58 of the jackscrew 56 on the cross member 66, and rotatably operating the extension shaft 60 of the jackscrew 56 to extend into tight engagement with the upper interior surface of the respective pipe end 12′,14′. The jackscrew 62 are similarly installed respectively to extend angularly between the upper edges of the pipe ends 12′,14′ and the upper edges of the abutting end walls 46 of the two longitudinally centralmost curved forming elements 26, the V-shaped members 64 of the jackscrews 62 preferably being adapted for connection, such as by a mating pin and slot or similar arrangemeent, at the location of their engagement of the abutting end walls 46. As will be understood, the particular type of bracing arrangemeent 30 described is not critical and various other forms of braces, jackscrews or the like and other arrangements of bracing may be additionally or alternatively employed, it only being important that some means of bracing between the pipeline sections 12,14 and the assembled forming elements 24,26 be provided to hold the forms rigidly in their desired molding disposition.

Once the bracing arrangement 30 has been installed, concrete or any other suitable cementitious material may be poured into the manhole housing 16 around the forming apparatus 22 to the desired height, ordinarily to approximately the level of the upper transverse edges of the forming elements 24,26. The concrete may be vibrated as desired or necessary to expel air pockets therein and the forming apparatus 22 may be employed to support a workman to finish and level the surfaces of the concrete adjacent the forming apparatus 22 as desired. The forming apparatus 22 is left in place for a sufficient amount of time to permit the concrete to set and cast to its desired molded configuration, after which the forming apparatus 22 is dismantled by the reverse of the above-described assembly process. As will thus be understood, the forming apparatus 22 creates a compoundly curved depression in the concrete material causing the depression to be cast in the floor of the manhole in conformity with the molding surfaces 32,44 of the forming elements 24,26 thereby forming a curvilinear invert in the manhole floor of a precise transverse and longitudinal arcuate curvature between the pipe ends 12′,14′.

In certain situations, it is desirable to form the manhole floor to a greater height than half the height of the pipeline sections being connected and correspondingly to provide the invert with a greater depth, commonly referred to as full height inverts. It is contemplated that the forming apparatus of the present invention may be modified to provide for forming such full height inverts by providing vertical extensions from or attachments to each transverse side of each forming element 24,26 to the additional height desired.

The advantages of the present invention will be recognized by those skilled in the art. Whereas it has been conventional practice in the past to form curvilinear manhole invert troughs between angularly related pipeline sections by hand troweling of concrete material poured in the manhole housing, this practice requiring considerable labor and as much as greater than one workday's time and further producing a finished invert of only borderline acceptability, the present invention facilitates the accurate and precise formation of arcuately curvilinear inverts of substantially exactly the same angular degree of longitudinal curvature as the angular relation of the pipes being connected and of substantially exactly the same transverse curvature as the cross-sectional curvature of such pipes. The accuracy and smoothness of the invert curvature provided greatly enhances the flow of material through the pipeline system and accordingly reduces any likelihood of pipeline operational problems in such regard. The set-up of the forming apparatus of the present invention requires a minimal amount of time and labor, ordinarily being completed by two workmen in approximately one hour of time. Accordingly, with the use of precast manhole housings, the "turn-key" construction of a manhole in a pipeline system may ordinarly be completed in several hours by employing the present invention. In sum, the present invention greatly simplifies and improves the construction of manholes in which angularly-related pipeline sections converge and are connected.

Although the present invention has been described herein in its preferred embodiment for casting manhole inverts, those skilled in the art will recognize that the present invention is of a broad utility which may be applicable not only in casting manhole inverts but also in casting other troughs in situ, e.g. drainage pipe, or in many other similar casting operations such as the casting of concrete pipe. In this regard, the term "invert" is to be understood to be used herein in its broadest ordinary meaning as the bottom of a conduit, whether such conduit is a manhole or drainage trough, a concrete pipe or the like. Thus, the present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. A forming element for use in casting pourable cementitious material to form a curvilinear invert section in a manhole, said forming element being equilaterally wedge-shaped and comprising a compoundly-curved molding surface having a transverse extent and a longitudinal extent and being substantially semi-circularly curved in said transverse extent for the entirety of said longitudinal extent and substantially arcuately curved in said longitudinal extent concentrically at each transverse side thereof for the entirety of said transverse extent with the longitudinal ends of said molding surface extending radially relative to the longitudinal curvature thereof, and a transverse end wall at each longitudinal end of said molding surface arranged radially to the longitudinal curvature thereof, said forming element being adapted to be disposed in said manhole with said molding surface in a downwardly facing disposition for pouring and casting of said cementitious material thereabout to cause a depression to be cast in said cementitious material in conformity with the longitudinal and transverse curvatures of said molding surface thereby to form said invert section with a precise longitudinally and transversely arcuate compound curvature.

2. A forming element according to claim 1 and characterized further in that the angular degree of said longitudinal curvature between the longitudinal ends of said molding surface corresponding to the desired angular degree of longitudinal curvature of said trough section.

3. A forming element according to claim 2 and characterized further in that the radii of longitudinal curvature of said molding surface are of a predetermined relation to the dimensions of said manhole such that the longitudinal extent of said molding surface is smaller than the dimension of said manhole taken at the location at which said trough section is desired along a corresponding arcuate curvature as said longitudinal extent.

4. A forming element according to claim 3 and characterized further in that said manhole is substantially circular, and the radius of longitudinal curvature of said molding surface at its longitudinal center is smaller than the radius of curvature of said manhole.

5. A forming element according to claim 4 and characterized further in that said forming element includes reinforcing means extending longitudinal between said end walls at the inward side of said molding surface.

6. A forming element according to claim 1 and characterized further in that the radii of longitudinal curvature of said molding surface are of a predetermined relation to the dimensions of said manhole such that the longitudinal extent of said molding surface is smaller than the dimension of said manhole taken at the location at which said trough section is desired along a corresponding arcuate curvature as said longitudinal extent.

7. A forming element according to claim 6 and characterized further in that said manhole is substantially circular, and the radius of longitudinal curvature of said molding surface at its longitudinal center is not greater than approximately the same as the radius of curvature of said manhole.

8. Forming apparatus for use in casting pourable cementitious material to form a curvilinear invert section in a manhole, said forming apparatus comprising a plurality of equilaterally wedge-shaped forming elements, each said forming element respectively including a compoundly-curved molding surface having a transverse extent and a longitudinal extent and being substantially semi-circularly curved in said transverse extent for the entirety of said longitudinal extent and substantially arcuately curved in said longitudinal extent concentrically at each transverse side thereof for the entirety of said transverse extent with the longitudinal ends of said molding surface extending radially relative to the longitudinal curvature thereof and each said forming element further including a transversely-extending end wall at each longitudinal end of said molding surface arranged radially relative to the longitudinal curvature thereof, said molding surfaces of said forming elements respectively having corresponding transverse curvatures of corresponding transverse and arcuate extents and having corresponding longitudinal curvatures with at least some of said molding surfaces being of varying longitudinal and arcuate extents, and means for selectively assembing said forming elements in longitudinal end-to-end relation with their end walls in abutment and their transverse and longitudinal extents in resective alignment for selective disposition of said forming elements respectively individually and in selective assembled combinations thereof in said manhole with the molding surface thereof in a downwardly facing disposition for pouring and casting of said cementitious material thereabout to cause a depression to be cast in said cementitious material in conformity with the longitudinal and transverse curvatures of said molding surface thereby for forming said invert section with a precise longitudinally and transversely arcuate compound curvature of a selectively variable longitudinal and arcuate extent.

9. Forming apparatus according to claim 8 and characterized further in that the radii of longitudinal curvature of said molding surfaces are of a predetermined relation to the dimensions of said manhole such that the total longitudinal extent of all said molding surfaces when all said forming elements are assembled is smaller than the dimension of said manhole at which said trough section is desired.

10. Forming apparatus according to claim 9 and characterized further in that said manhole is substantially circular, and the radius of longitudinal curvature of said molding surfaces at the longitudinal centers thereof is smaller than the radius of curvature of said manhole.

11. Forming apparatus according to claim 10 and characterized further in that the total angular degree of longitudinal curvature of said molding surfaces when all said forming elements are assembled is at least substantially ninety degrees (90°).

12. Forming apparatus according to claim 10 and characterized further in that the respective angular degrees of longitudinal curvature of said molding surfaces are mathematical factors of ninety degrees (90°).

13. Forming apparatus according to claim 12 and characterized further by at least three forming elements, said molding surfaces of said forming elements respectively having longitudinal curvatures of approximately twenty-two and one-half degrees (22.5°), eleven and one-fourth degrees (11.25°), and five and five-eights degrees (5.625°).

14. Forming apparatus according to claim 13 and characterized further by assembly means for joining said end walls of said forming elements in abutment with one another for selective assembly of said forming elements.

15. Forming apparatus according to claim 14 characterized further in that each said forming element includes reinforcing means extending longitudinally between said end walls at the inward side of said molding surface.

16. Forming apparatus according to claim 8 and characterized further in that the respective angular degrees of longitudinal curvature of said molding surfaces are mathematical factors of ninety degrees (90°).

17. Forming apparatus according to claim 16 and characterized further by at least three forming elements, said molding surfaces of said forming elements respectively having longitudinal curvatures of approximately twenty-two and one-half degrees (22.5°), eleven and one-fourth degrees (11.25°), and five and five-eights degrees (5.625°).

18. Forming apparatus according to claim 17 and characterized further in that the total angular degree of longitudinal curvature of said molding surfaces when all said forming elements are assembled is at least substantially ninety degrees (90°).

19. Forming apparatus for use in casting cementitious material to form a curvilinear invert between an inlet pipe and an outlet pipe angularly oriented in said manhole, comprising two longitudinally-straight forming elements adapted for slidable disposition respectively in said inlet and outlet pipes, each said straight forming element respectively having a hemi-cylindrically shaped molding surface of a radius substantially the same as the internal radius of said inlet and outlet pipes and having a radial end wall at each axial end of said hemi-cylindrical molding surface, and at least one longitudinally-curved, equilaterally wedge-shaped forming element having a compoundly curved molding surface having a transverse extent and a longitudinal extent and being curved substantially semi-circularly in said transverse extent for the entirety of said longitudinal extent and substantially arcuately curved in said longitudinal extent concentrically at each transverse side thereof for the entirety of said transverse extent with the longitudinal ends of said compoundly-curved molding surface extending radially relative to the longitudinal curvature thereof and said forming element having a transversely-extending end wall at each longitudinal end of said compoundly-curved molding surface arranged radially relative to the longitudinal curvature thereof, the transverse curvature of said compoundly curved molding surface being of a radius substantially the same as said straight forming elements and the longitudinal curvature of said compoundly-curved molding surface being of substantially the same angular degree as the angular relation of said inlet and outlet pipes about radii selected such that said longitudinal extent is less than the distance between said inlet and outlet pipes taken about a corresponding arcuate curvature, and means for selectively assembling said straight and curved forming elements in longitudinal end-to-end relation with their adjacent end walls in abutment and their transverse and longitudinal extents in respective alignment for disposition of said straight and curved forming elements in said manhole with said straight forming elements slidably positioned respectively in said inlet and outlet pipes and with said hemi-cylindrical and compoundly-curved molding surfaces in a downwardly facing disposition for pouring and casting of said cementitious material thereabout to cause a depression to be cast in said cementitious material between said inlet and outlet pipes in conformity with the molding surfaces of said forming elements thereby to form said curvilinear invert with a section thereof having a precise longitudinally and transversely arcuate compound curvature.

20. Forming apparatus according to claim 19 and characterized further in that said manhole is substantially circular, and the radius of longitudinal curvature of said compoundly curved molding surface at its longitudinal center is smaller than the radius of curvature of said manhole.

21. Forming apparatus according to claim 19 and characterized further by assembling means includes means for joining said end walls of said forming elements in abutment with one another for selective assembly of said forming elements.

22. Forming apparatus according to claim 21 and characterized further by brace means adapted for extending between said inlet and outlet pipes and said forming elements when assembled in said manhole to maintain said forming elements in desired position during the pouring and casting of said cementitious material.

23. Forming apparatus according to claim 19 and characterized further by a plurality of said longitudinally-curved forming elements, the molding surfaces of said longitudinally-curved forming elements respectively having corresponding transverse curvatures and corresponding longitudinal curvatures with the longitudinal ends of each said molding surface extending radially relative to the longitudinal curvature thereof, the total angular degree of longitudinal curvature of said molding surfaces of said longitudinally-curved forming elements being substantially the angular relation of said inlet and outlet pipes.

24. Forming apparatus according to claim 23 and characterized further in that said molding surfaces of said longitudinally curved forming elements are respectively of varying longitudinal and arcuate extents between the respective longitudinal ends thereof.

25. Forming apparatus according to claim 24 and characterized further in that the respective angular degree of longitudinal curvature of said molding surfaces of said longitudinally-curved forming elements are mathematical factors of ninety degrees (90°) and their total angular degree of longitudinal curvature is substantially ninety degrees (90°).

* * * * *

UNITED STATES PATENT OFFICE
CERTIFICATE OF CORRECTION

Patent No. 4,484,724          Dated Nov. 27, 1984

Inventor(s) James Srackangast

It is certified that error appears in the above-identified patent and that said Letters Patent are hereby corrected as shown below:

Column 3, line 66, delete "is" and insert therefor --its--.
Column 4, line 40, delete "modling" and insert therefor --molding--. Column 5, line 5, delete "having" and insert therefor --have--. Column 5, line 5, delete "therewith" and insert therefor --therethrough--. Column 6, line 42, delete "materials" and insert therefor --material--.
Column 8, line 67, delete "jackscrew" and insert therefor --jackscrews--. Column 11, line 5, delete "longitudinal" and insert therefor --longitudinally--. Column 11, line 18, delete "not" and insert therefor --no--. Column 11, line 47, delete "resective" and insert therefor --respective--.
Column 14, line 8, delete "position" and insert therefor --disposition--.

Signed and Sealed this

Fourteenth Day of January 1986

[SEAL]

Attest:

DONALD J. QUIGG

Attesting Officer      Commissioner of Patents and Trademarks